United States Patent [19]

McKeegan et al.

[11] 3,740,759

[45] June 19, 1973

[54] TIME ACCOUNTING APPARATUS

[75] Inventors: James J. McKeegan, Ocean City, N.J.; Oliver F. Cheney, Philadelphia; Ignatius F. Bash, Huntingdon Valley, both of Pa.

[73] Assignee: Alcotronics Corporation, Mount Laurel Township, N.J.

[22] Filed: June 18, 1971

[21] Appl. No.: 154,509

[52] U.S. Cl..... 346/44, 235/61.11 E, 250/219 DC, 346/33 A, 346/82, 346/134

[51] Int. Cl............................................... G07c 1/14

[58] Field of Search..........346/52–54, 82–85, 134, 74 M, 74 MP, 44, 33 A; 235/61.11 E, 61.12 R, 61.12 M; 250/219 DC; 40/158 R

[56] References Cited

UNITED STATES PATENTS

| | | | |
|---|---|---|---|
| 804,934 | 11/1905 | Dey | 346/134 |
| 2,645,551 | 7/1953 | Sprecker | 346/85 |
| 2,918,654 | 12/1959 | Hillyer | 340/150 |
| 3,030,013 | 4/1962 | Moodie et al. | 346/83 X |
| 3,341,852 | 9/1967 | Kramer et al. | 346/53 X |
| 3,419,881 | 12/1968 | Yamamoto et al. | 346/53 X |
| 3,453,643 | 7/1969 | Amano et al. | 346/82 X |
| 3,463,930 | 8/1969 | West | 250/219 DC |
| 3,626,380 | 12/1971 | Griffin | 346/82 X |

*Primary Examiner*—Joseph W. Hartary
*Attorney*—Howson and Howson

[57] ABSTRACT

A time accounting method in which each employee is provided with time-card means bearing his name in visually readable form, having a time-imprintable portion, and having machine-readable coded indicia thereon identifying a number assigned to that employee. Time-clock appraratus is provided into which the time-card means is removably insertable, and which responds to insertion of the time-card means into it to print the time of insertion upon the imprintable portion of the time-card means, so that when the time-card means is removed it bears a visually-readable time imprint. The time-clock apparatus also responds to insertion of the time-card means to read the coded indicia thereon and to record corresponding information representative of the employee's identifying number upon a magnetic tape in a cassette unit within the time-clock apparatus. It also records the time of insertion automatically upon the tape in association with the employee's account number. Periodically, for example at the end of each week, the cassette is removed to a computer center where it is machine-read, and where payroll can be computed for the employees. Imprinting and reading of the time-card means are done "on the fly" as the time-card means is mvoing into or out of the time-clock apparatus. The time-card means may consist entirely of a flexible card similar to a computer punch-card with the coded indicia appearing as holes through the card near one end thereof; alternatively, the time-card means may comprise a flexible card and a reusable holder for the card, the coded indicia comprising holes through the holder near one of its ends and the name of the particular employee being embossed on the holder so it may be used later in effecting printing upon the card of the employee's name when the cards for one week are replaced with fresh cards for the next week.

7 Claims, 8 Drawing Figures

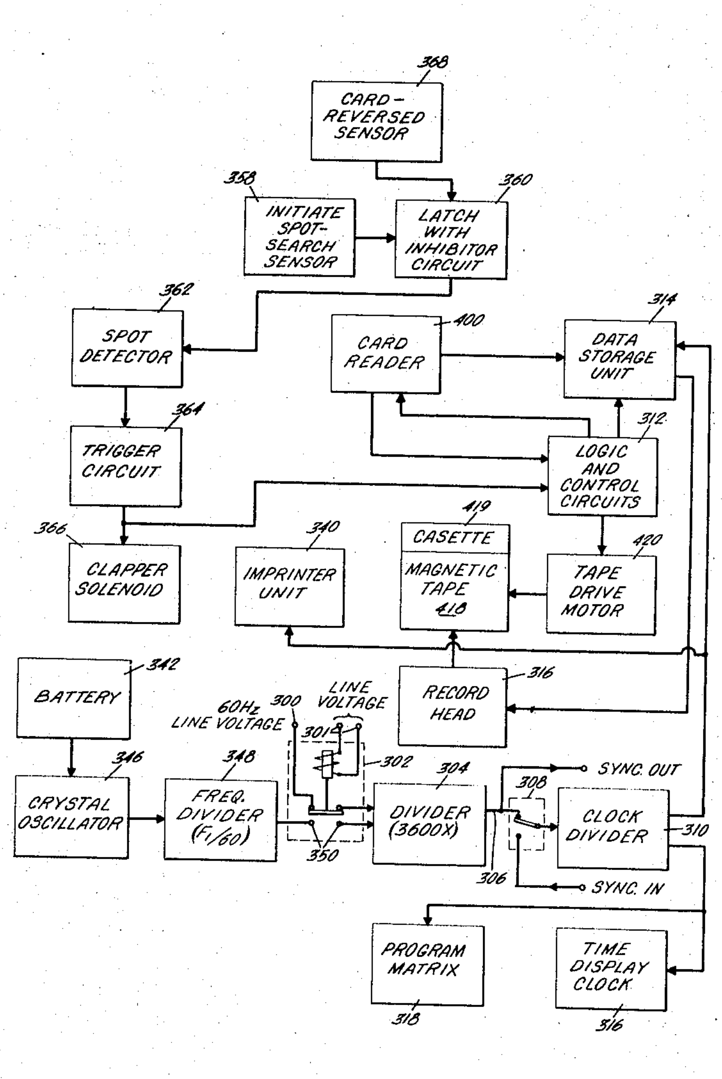
CARD-REVERSED SENSOR
368
INITIATE SPOT-SEARCH SENSOR
358
LATCH WITH INHIBITOR CIRCUIT
360
SPOT DETECTOR
362
CARD READER
400
DATA STORAGE UNIT
314
TRIGGER CIRCUIT
364
LOGIC AND CONTROL CIRCUITS
312
CLAPPER SOLENOID
366
IMPRINTER UNIT
340
CASETTE
419
MAGNETIC TAPE
418
TAPE DRIVE MOTOR
420
BATTERY
342
RECORD HEAD
316
60Hz LINE VOLTAGE
300
LINE VOLTAGE
301
302
CRYSTAL OSCILLATOR
346
FREQ. DIVIDER (F1/60)
348
350
DIVIDER (3600X)
304
306
308
SYNC. OUT
CLOCK DIVIDER
310
SYNC. IN
PROGRAM MATRIX
318
TIME DISPLAY CLOCK
316

FIG. 1.
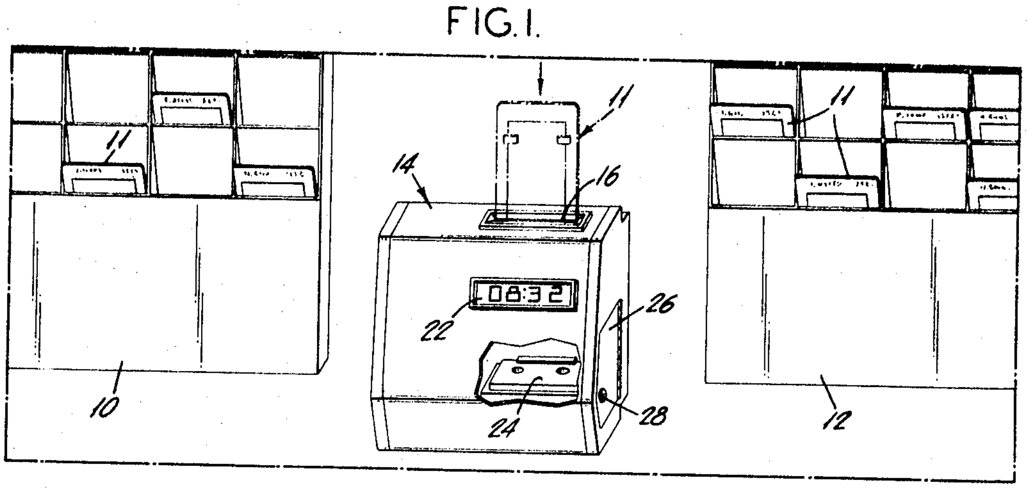
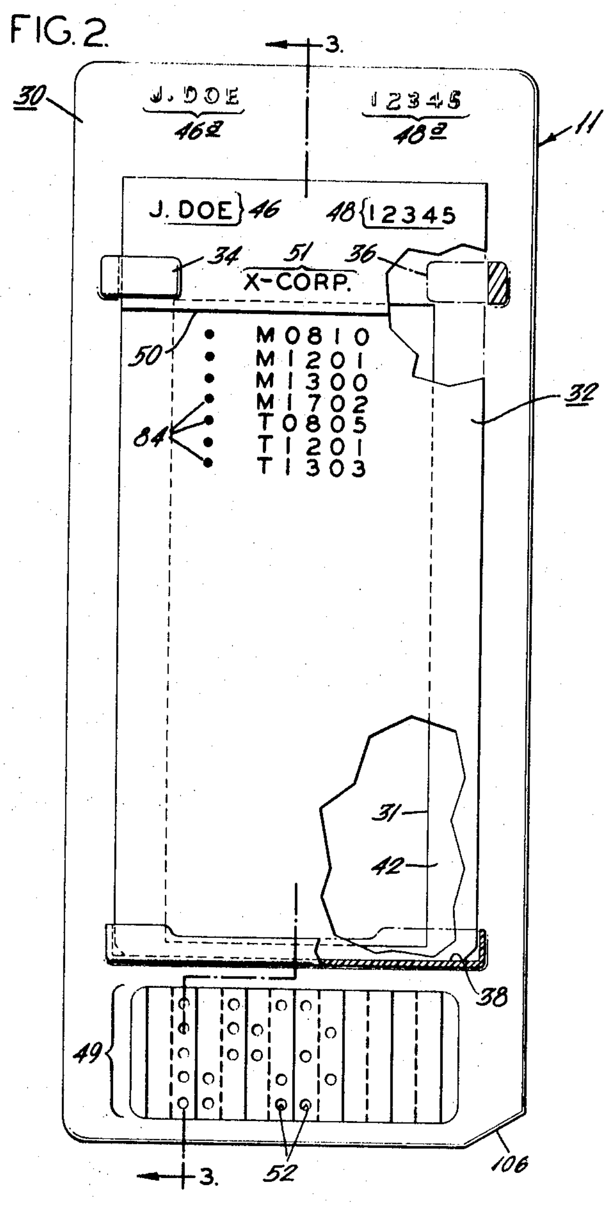
FIG. 3.
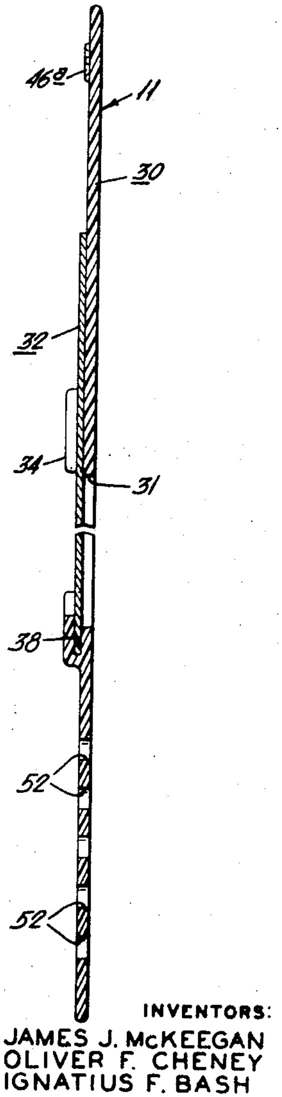
INVENTORS:
JAMES J. McKEEGAN
OLIVER F. CHENEY
IGNATIUS F. BASH
BY
Howson & Howson
ATTYS.

INVENTORS:
JAMES J. McKEEGAN
OLIVER F. CHENEY
IGNATIUS F. BASH
BY
Howson & Howson
ATTYS.

INVENTORS:
JAMES J. McKEEGAN
OLIVER F. CHENEY
IGNATIUS F. BASH
BY
Howson & Howson
ATTYS.

TIME ACCOUNTING APPARATUS

BACKGROUND OF INVENTION

This invention relates to methods for time accounting, and to time-clock apparatus and time-card means suitable for use therein.

There are a variety of applications in which it is desirable to provide records of the times when persons are at a predetermined location, perhaps the most common application being in providing records of the times at which employees arrive at, and leave, a work location, so that their hours on the job can be calculated and the pay which is due when computed.

The traditional way for providing such time accounting has been to use a time clock at the entrance and exit of a work location, and to keep near the time clock a rack of employee time cards, one for each employee. When the employee arrives at work, he inserts his card into the time clock, which responds to print the time upon the card, and when he leaves he does the same thing with the same result. In this way there is accumulated, on a separate card for each employee, a record for each day of the week of the times at which he enters and leaves the work location. The intervals between these times represent time on the job and, when multiplied by the appropriate hourly rate, gives the pay due each employee for that week. Accordingly, at the end of the week the time cards for all employees are collected from the rack, and a clerical staff computes the hours worked and the pay due, and makes up the payroll for the week.

It has been proposed to modernize such a time-accounting system by utilizing a time clock in which the time information is recorded upon a magnetic recording medium, or upon a punched paper tape, which can be removed at the end of the week and sent to a payrooll computing center. In some cases the employee's badge is utilized to feed information into the time clock apparatus so that the employee's identity will be recorded along with his time of arrival or departure. It has also been proposed to use the usual time-card, but to provide time-clock apparatus which will apply to the time cards coded markings representing time of insertion of the card into the time clock, the cards then being shipped to a computer center for reading and decoding. These and similar arrangements are discussed, for example, in U.S. Pat. No. 3,341,852 of Kramer et al, and to some extent in U.S. Pat. No. 3,401,394 of Leonard et al.

We have found that a truly satisfactory automatic system of time accounting must satisfy a number of different criteria. First, both state laws and union contracts commonly require that some visually readable record of employee's time-in and time-out must be made and kept. This not only provides a way of checking that the machine has properly recorded the employee's time, but also provides a suitable record in the event that there should be some flaw in the operation of the time recording machine, or some damage or misuse of the machine-made record, or some error in computer processing. Secondly, the traditional system using time-cards kept in racks near a time clock, and with visually-readable time imprints thereon, is one to which employees have become accustomed, which they can employ without changing their habits, and in which they have confidence. Thirdly, whatever system is used should be simple for the employee to operate, reliable, convenient and relatively inexpensive.

It is therefore an object of the invention to provide a new and useful method of time accounting, and new and useful time-clock apparatus and time-card means.

Another object is to provide such method, apparatus and means which provide a suitable and convenient time-card record visually readable by the employee, and yet provide suitable time information for convenient and rapid automatic processing.

Another object is to provide such method, apparatus and means which are convenient, easy, reliable, and inexpensive to provide and use.

SUMMARY OF THE INVENTION

These and other objects of the invention are achieved generally as follows. Time-card means are provided, one for each person in the group whose time is to be accounted for, each of the time-card means having on it an array of machine-readable coded indicia representing information which identifies the particular person associated with that time-card means. The time-card means also bears the name of the associated person in visually readable form, and has an imprintable portion for receiving time imprints. The appropriate time-card means, which may be stored in a rack adjacent the entrance or exit from a work location, is selected by the person to whom it belongs, and momentarily inserted by him into time-clock apparatus which automatically prints the time of insertion upon the imprintable portion of the time-card means. The time-clock apparatus comprises means for receiving the imprintable time-card means and for automatically imprinting the time of insertion upon the time-card means, and in addition comprises a magnetic recording medium and means for automatically reading the coded indicia on the time-card means and recording, upon the magnetic medium, the information as to employee identity represented by the coded indicia, together with the time of insertion. The employee may then remove and examine the imprinted time-card means to assure himself that the proper time has been printed on it, and replace it in the rack. Periodically, for example once a week, the magnetic medium, which preferably is in the form of a magnetic tape cassette, may be removed from the time-clock apparatus and taken to another location where the information contained thereon may automatically be read out and utilized to compute time on the job and payroll.

Preferably the method, time-clock apparatus and time-card means of the invention include one or more of the following features. The coded indicia are in the form of holes extending through the time-card means adjacent one end thereof, and are read by photosensitive means contained within the time-clock apparatus; preferably this reading is accomplished after the imprinting and while the time-card means is being withdrawn from the time-clock apparatus. The time-clock apparatus preferably includes means for sensing when the time-card means has been inserted to the proper distance for initiating time imprinting thereon and for sensing whether the time-card means has been inserted into the apparatus in the proper predetermined orientation and for preventing operation of the imprinting means unless this orientation is proper. The signals for controlling the time imprinted on the time-card means are derived from a source of time-representing clock signals which is also utilized to supply the time signals recorded on the magnetic tape. In one form, the time-card means comprises a simple flexible card, such as an ordinary computer punch card, with the coded array of indicia in the form of punched holes near one end thereof, the imprintable area being toward the other end of the card from the punched holes. In another form, a reusable card holder is utilized which holds a flexible imprintable card, preferably so that the card extends over a window provided in the holder; the coded array of indicia is provided near one end of the holder and time imprinting is provided on the card in the region extending over the window. The holder is used over a long period of time, the old cards being removed and replaced with fresh ones at the end of a standard period, typically a week. Preferably the time-card holder has the name of the corresponding employee embossed thereon, so that the holder can be utilized to imprint the name of the employee upon the fresh card.

With this arrangement, not only are legal and labor-union requirements met with respect to the provision of a permanent, visually-readable record, but this record is provided in a form very like that traditionally utilized in time clock operations, and the manner of operation of the system is that with which employees are familiar from the past. Furthermore, the system is inexpensive, easy and reliable to operate, and provides magnetically recorded information in a form suitable for high-speed machine reading and subsequent computer calculation of work-time and pay due.

BRIEF DESCRIPTION OF FIGURES

These and other objects and features of the invention will be more readily understood from a consideration of the following detailed description, taken in connection with the accompanying drawings, in which:

FIG. 1 is a perspective view of a time-clock station in which the invention is employed;

FIG. 2 is a front view of time-card means according to the invention;

FIG. 3 is a sectional view taken along lines 3—3 of FIG. 2;

DETAILED DESCRIPTION OF SPECIFIC EMBODIMENTS

Figure 4:
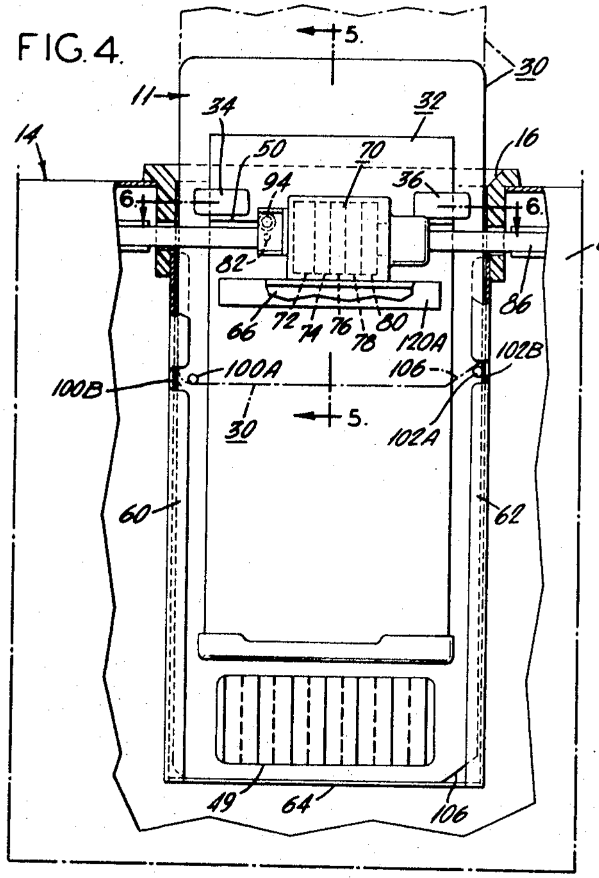
FIG. 4 is an enlarged fragmentary view, partly in section and with parts broken away, showing a portion of the interior of the time-clock apparatus of FIG. 1.

Referring now to the particular embodiments of the invention shown in the drawings by way of example only, FIG. 1 illustrates a pair of spaced-apart racks 10 and 12 for holding time-card means such as 11, one for each employee. Between the racks there is positioned a time-clock apparatus 14 having a receiving slot 16 in its top into which a time-card means is inserted momentarily by employees as they pass the time-clock apparatus on their way into or out of an adjacent work location. The time-card means 11 are stored in the racks 10 and 12, and as will be described hereinafter, each may comprise a holder having a flexible card held within it, or instead may comprise a card without holder.

Assuming for example that the work location is at the right of the area shown in FIG. 1, the employee arriving for work will remove his time-card means from rack 10, insert it momentarily into the slot 16 in the time-clock apparatus 14 until he feels and hears the action of the time-clock apparatus printing the time on the time-card means, at which point he withdraws it, places it in the appropriate position in rack 12, and continues on to his working location. The reverse procedure is used when he leaves work.

Each time the employee inserts his time-card means into the time-clock apparatus for time imprinting and removes it, he may then examine it himself to ascertain that the proper time has been imprinted thereon, which proper time is also shown by the electronic digital clock display 22 on the front of the time-clock apparatus. The time-clock apparatus includes within it means for sensing when the card has been inserted sufficiently far for the time printing mechanism to be aligned just below the last time imprint previously made on the card, and for then operating a rapid-action imprinter within the time-clock apparatus to print on the time-card means the time of the present insertion, just below the last imprint. Also included are means for sensing the time at which such imprinting occurs and for immediately actuating a photosensitive card reader in the time-clock apparatus, which reads indicia provided at the lower end of the time-card means as the time-card means is withdrawn from the time-clock apparatus, as will be described in detail hereinafter.

The time-clock apparatus 14 also includes appropriate electronic circuitry for recording upon a magnetic tape, located within a tape cassette 24, information identifying the employee and the time at which he inserts his time-card means. A door 26, with a key operated lock 28, is provided in the cabinet of the time-clock apparatus which, when opened, provides access to the tape cassette so it may be removed at the end of a week, for example, and taken to a computer center where the information thereon may be machine-read in a form suitable for input to a standard computer. The latter computer may then be utilized to compute the hours for which the employees were on the job, and to prepare a suitable payroll based upon these hours of work.

Referring now particularly to FIGS. 2 and 3, the preferred form of time-card means comprises a card holder 30, which may be of generally rectangular form and composed of a thin opaque plastic or metal material having a central generally-rectangular window or opening 31 therein. The holder 30 is adapted to receive and hold a flexible imprintable card 32, typically of paper or cardboard, which can be inserted into and removed from the holder at will. In this example there are provided for this purpose a pair of opposed fingers 34 and 36 extending toward each other from opposite sides of the holder and behind which the card 32 can readily be slipped. A card-receiving groove 38 is provided in the holder along the lower side of the window 31, in which the bottom end of the card fits snugly to hold it securely in place. The card, when in position in the holder, extends over the window 11. On the reverse side of the card holder the vertical side edges of the window 11 may be provided with inwardly-extending shoulders 42 to stabilize the card against rearward motion. Printed indicia 46 near the top of the card display the name of the person to whom the card is assigned in visually-readable form, and in this example an identifying number, shown at 48, for the same person is printed in visually-readable Arabic numerals. Below the printed indicia 46 and 48 there is printed on the card 32 a dark horizontal line 50, for reasons discussed fully hereinafter. The name of the employing company may also be printed on each card, as at 51.

Near the top of the card holder 30, and above the card 32, there are provided indicia 46*a* and 48*a* which are the same as the indicia 46 and 48 except that they are embossed on, or raised from, the surface of the holder, rather than printed. At the lower end of the card holder 30 there is provided an array 49 of coded indicia means in the form of holes such as 52 extending entirely through the thickness of the card holder 30, the positions of the holes representing, in the aggregate, the same employee number as is printed at 48 and 48*a*, and any additional desired information. While any of a variety of coding arrangements may be utilized, in this example there are provided five horizontal rows of holes each row representing in coded binary form one digit in the employee five-digit identification number. A sixth row can be added for a check-character, if desired.

More particularly, the twelve vertical bit columns are divided into six pairs of adjacent columns, four of these pairs in each row representing one of the digits of the employee's identification number in binary notation; for example, in the top row the first pair of positions may represent the 8's place, the next pair the 4's place, the next pair 2's place and the fourth pair the units place. A hole through the holder in the left column of each pair indicates a binary 1 and a hole in the right column indicates a 0. Although it is possible to represent the binary number by using only one such column per binary digit ("no hole" representing a 0), it is preferred to provide a hole for each zero even though this is redundant, as an aid in checking the accuracy of operation by means of logic circuits using the redundant information.

Figure 5:
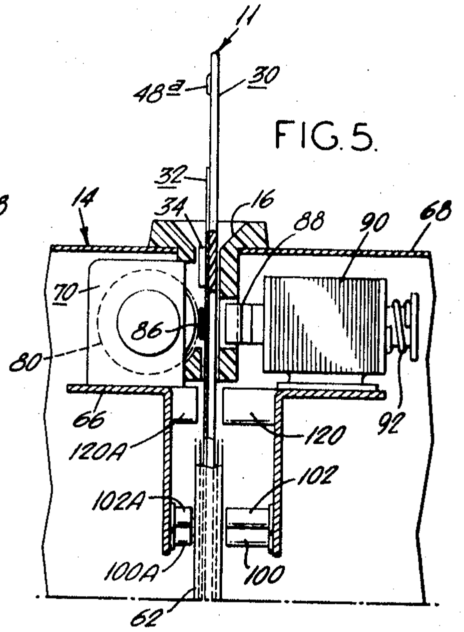
FIG. 5 is a sectional view taken along lines 5—5 of FIG. 4.
Figure 6:
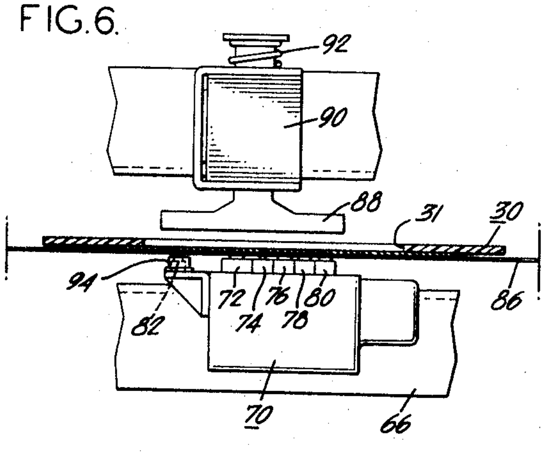
FIG. 6 is a sectional view taken along lines 6—6 of FIG. 4.

Referring now particularly to FIGS. 4, 5 and 6, the slot 16 in the top of the time-clock apparatus 14 for receiving the card holder 30 guides the holder into a pair of downwardly-extending, spaced-apart U-shaped channel members 60 and 62 serving as lateral positioning guides for the card holder as it is inserted. A bottom stop 64 extending between the opposite channel members arrests the maximum downward motion of the card, although in general use the card holder will not be inserted far enough to reach this bottom member. Extending horizontally adjacent one face of the inserted card (referred to herein as the front face) is a support bracket 66 mounted on the frame 68 of the time-clock apparatus. The bracket 66 supports an imprinter unit 70 comprising, in this example, five printing wheels 72, 74, 76, 78 and 80 each independently and controllably rotatable about a common axis, together with a spot printer 82 mounted on the unit 70 and having its printing face extending towards the adjacent front face of the card 32. The leftmost of the printing wheels as viewed in FIG. 4 is adapted to print an abbreviation of the day of the week, and the other four print wheels are adapted to print the digits of the time of day in military, four-digit form. The spot printer 82 is adapted to print a spot, such as 84 in FIG. 2, spaced laterally from, but horizontally aligned with, the time imprint digits. As shown particularly clearly in FIG. 5, a conventional ink ribbon 86 extends between the print wheels and the front face of the card, and a clapper 88 is mounted adjacent the reverse face of the card and responds to a pulse of current through the associated solenoid 90 to cause the clapper 88 to move nearly instantaneously against the rear surface of the card and urge it into contact with the printing wheels and the spot printer, thereby to effect the desired printing of the spot, the abbreviation of the day of the week, and the time of day in hours and minutes.

The solenoid 90 is mounted to the frame 68 of the time clock apparatus, and the clapper 88 may be spring-biased to a return position spaced from the card, by means of the return spring 92. The printing wheels may be operated in conventional manner from a source of clock signals to be described hereinafter so as to always represent the proper day, and time of day, for printing thereof on the card each time the solenoid 90 is supplied with an actuating pulse.

Also mounted on the imprinter unit 70 is a photoelectric spot detector 94 vertically aligned with the spot printer 82, and comprising means for directing a light beam forwardly of the spot detector and for receiving and detecting light reflected from the adjacent card surface directly in front of the spot detector. When the spot detector is directly aligned with a dark spot on the card, it produces a low electrical output, and at other times it produces a high electrical output, thereby producing signals which indicate the times at which the spot detector is aligned with a dark spot on the card. The low-signal output of the spot detector is utilized to time the action of the imprinter. For example, assuming the card has not previously had imprints made thereon, when it is inserted into the slot 16 the first dark spot on the card encountered by the spot detector will be the horizontal line 50, detection of which by the spot detector will cause imprinting of the first line of characters shown in FIG. 2 as M 0810 plus the preceding spot designated at 84. In this connection it is noted that the spot detector is positioned slightly upwardly from the line along which the imprinting occurs, so that the printing will occur, as desired, just below the line 50.

After the first line of characters has been imprinted, when next inserted the time-card means will enter the slot 16 until the spot detector detects the spot 84, at which time the imprinter will be actuated to print the next lower line of data and a corresponding spot, and so on down the card when subsequent insertions are made. It is noted that there is no fixed or arrested position for the card at the time of imprinting, and in this sense printing is done "on the fly".

In the present example in which the time-card means comprises the holder 30 carrying the imprintable card 32, it is noted that the lower part of the holder will intercept light from the spot detector before the spot detector is aligned with the surface of the imprintable card, and if the card holder is relatively dark or nonreflective this might cause the spot detector to produce a low-level signal indicating the presence of a dark spot, with resultant premature operation of the printer. Also, before the holder is inserted, there will generally be little or no light returned to the spot detector, a condition which would be expected to result in the printer being actuated continuously. Accordingly, means are provided for preventing the spot detector output from actuating the printer until after the holder has been inserted far enough for the spot detector to be aligned with the card portion 32.

More particularly, in this example the intiate spot-search sensor comprises a light source 100 for directing a beam of light through the region 100B (FIG. 4) toward the photo sensitive device 100A, together with suitable associated electrical connections and circuitry, which may be conventional and are not shown. The region 100B is positioned so that the beam from the source 100 will reach the photosensitive device 100A unless intercepted by the inserted card holder. The position of the card holder shown in broken line in FIG. 4 illustrates the condition in which the card holder has been inserted just far enough to completely intercept the latter light beam. The vertical position of the region 100B is preferably such that when the card holder reaches the position shown in broken line, the imprinter is aligned opposite the lower portion of the card in the card holder, so that imprinting be provided along the complete length of the card. Once the card holder has interrupted the light beam from source 100, it is assured that, as soon thereafter as the spot sensor 94 detects a dark spot, the imprinter will be in a suitable position to effect printing of the time of insertion of the card.

The card-reversed sensor comprises the source 102 of a light beam which is directed toward a photosensitive device 102A, so that the light beam extends through the region 102B intercepted by the card holder when it is inserted. The lower right edge of the card holder is provided with a diagonal cut at 106, and the region 102B is located slightly above region 100B. Accordingly, as can be seen from the position of the card holder shown in broken line in FIG. 4, if the card is inserted in the proper orientation, light from the initiate spot-search sensor will be intercepted completely before any of the light from the card-reversed sensor is intercepted. As will be described hereinafter, suitable circuits are provided for assuring that under these conditions spot search will be initiated. However, it can also be readily seen that if the card holder is turned around about either a horizontal or vertical axis, and then inserted in an improper orientation, the lower edge of the card holder will cause the beam of the card-reversed sensor to be intercepted before the beam of the initiate spot-search sensor is intercepted. Under these conditions, the circuitry employed prevents the initiate spot-search sensor from effecting the initiation of spot searching and hence prevents imprinting, and requires that the employee remove the card and insert it in the proper orientation before imprinting can occur.

Also provided is a card reader comprising a horizontally-disposed set of light sources 120 equal in number to the number of columns of indicia contained in the array at the bottom of the card holder 30, and a corresponding array of photosensitive devices 120 disposed on the opposite side of the card holder when it is inserted to receive light from the light sources 102 when aligned with an opening through the card holder. This provides reading of the coded indicia at the bottom of the card holder as it is withdrawn after imprinting of time on the card. Thus when the top row of indicia is aligned with the card reader, wherever there is a hole through the card the corresponding photosensitive devices will produce an output electrical signal, while the other photosensitive devices will not. The particular combination of photosensitive devices producing outputs then represents, in parallel binary form, one digit of the employee identification number and, in addition, may represent additional characters or symbols useful for parity checks or other computer functions, if desired. As the card is withdrawn, successive horizontal rows of indicia are read by the card reader in this manner.

Figure 7:
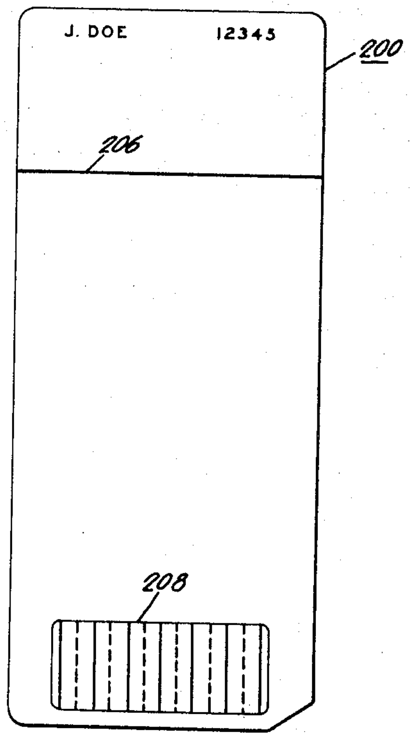
FIG. 7 is a front view of another form of time-card means in accordance with the invention.

Referring now to FIG. 7, another suitable form of time-card means is shown comprising a generally rectangular flexible card 200 of conventional material, such as paper or cardboard, which may be utilized in place of the card holder and card described in the previous embodiments. Across the top of the card there is printed the employee's name, and preferably also his identification number, in visually readable form, and beneath that the dark line 206 which cooperates with the spot detector, as described previously. Near the bottom of the card is the array of coded indicia 208, which again may be in the form of holes extending through the card. A diagonal cut is also provided at the lower right edge of the card, corresponding to the similar shape of the card holder in the previously described embodiment. The card is used in the same manner as is the previously described time-card means, typically being stored in racks adjacent to the time-clock apparatus for removal by the employee and insertion in the time-clock apparatus to imprint thereon the day and time of insertion. The time-clock apparatus reads the coded employee identification number and records it upon a magnetic medium, typically a tape on a tape cassette, along with the time of insertion of the card.

The card shown in FIG. 7 may, in fact, be similar to or even identical with a standard computer punch card, the coded array near the bottom thereof comprising typical punch holes produced by a manual punch-card machine or by the computer as it computes the previous week's payroll. The construction and operation of the remainder of the system may be identical with that previously described herein, except that in this example the time-card means is not supplied with embossed information suitable for imprinting of further cards; instead the information is printed on the time cards in conventional manner.

Figure 8:
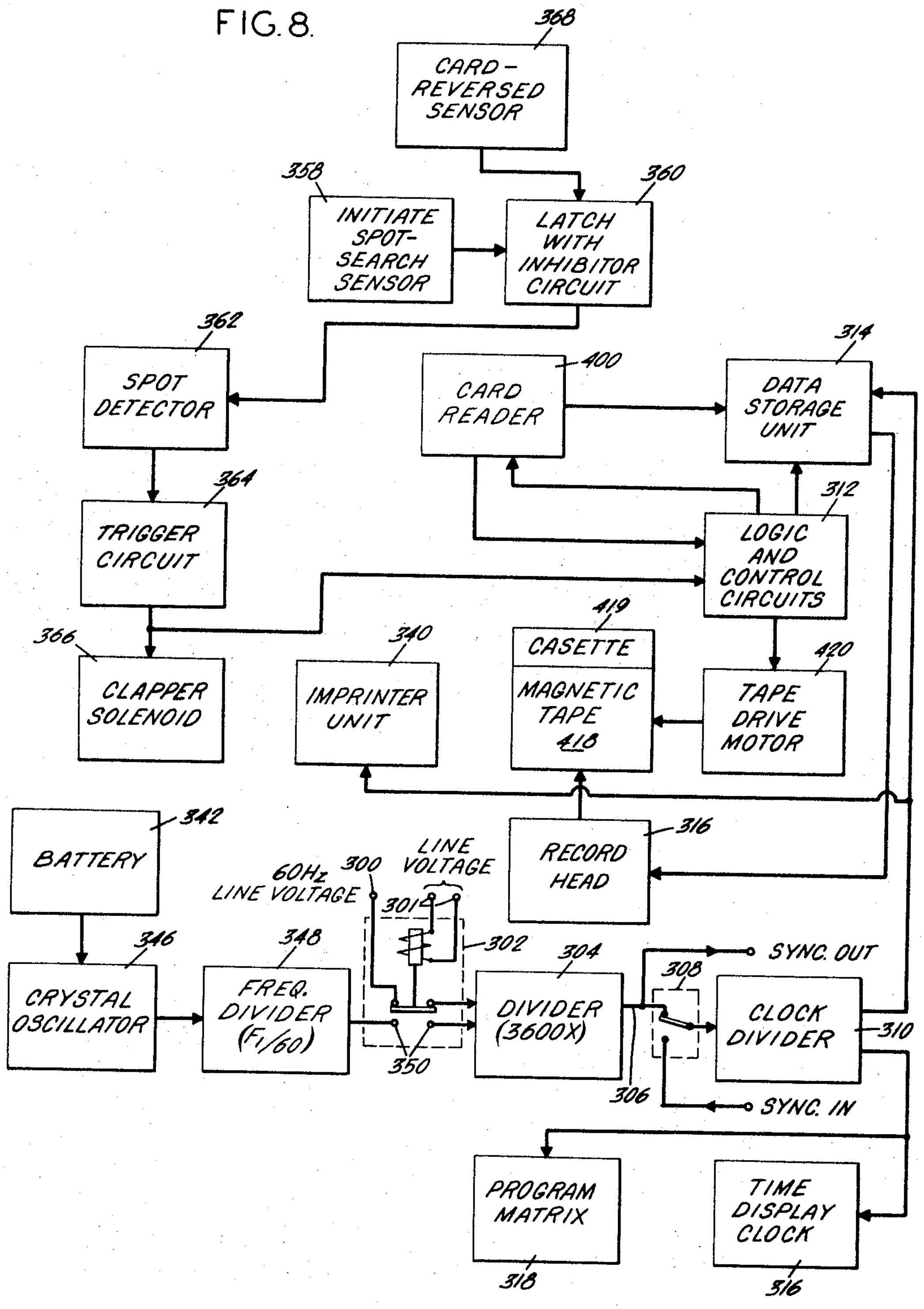
FIG. 8 is a block diagram illustrating a system in accordance with the invention.

Referring now to FIG. 8, a typical organization of the system suitable for use in the invention will now be described.

A standard 60-cycle line voltage source is connected to terminal 300 and to terminals 301 of electronic switch or relay 302, thereby normally to supply 60-cycle current through the relay 302 to a frequency divider 304, which divides the frequency by a factor of 3,600. The signal on the output line 306 of the divider therefore constitutes pulses recurrent at the rate of one per minute. The latter pulses are supplied through the sync control switch 308 to a conventional clock divider 310, which serves the function of deriving suitable timing pulses for operating the various devices to which its output is supplied. More particularly, the output of the clock divider supplies timing signals to data storage unit 314: to time display clock 316, which may be the digital clock in the front of the time clock apparatus; to a program matrix 318, which may control other timed operations in the work location such as ringing of bells at the beginning and end of work periods; and to the imprinter unit 340 to control the advance of the print wheels so they will represent the proper day and time of day.

Several auxiliary features are also shown. For example, if the 60-cycle line voltage disappears, or becomes unsuitable for some reason, an alternate battery-operated source of 60-cycle is automatically switched into the circuit to supply the 60-cycle timing signal, and to supply operating power also to dividers 348, 304 and 310, as well as to data storage unit 314 and logic and control circuits 312, so as to preserve time information and existing data until the 60-cycle line power returns. Thus battery 342 powers a crystal oscillator 346 operating at any convenient high frequency, the output of which is supplied to a frequency divider 348 for dividing the frequency down to the desired 60-cycle rate for application to contact 350 of the relay 302. When the 60-cycle signal is being supplied from a line voltage source, the line holds the armature of the relay 302 in the position shown whereby the 60-cycle line current is supplied to divider 302. However, when the line voltage is turned off, or fails accidentally, the relay contact 350 supplies the 60-cycle signal derived from crystal oscillator 346 to the input of divider 304, in place of the line voltage signal; the remainder of the system then operates as described previously. If desirable, the entire system may be operated from a storage battery, for example where there is no AC line voltage supply available, or where its reliability and frequency accuracy are not adequate.

The initiate spot-search sensor 358 is connected through the "latch with inhibitor circuit" 360 to the spot detector 362 to enable the spot detector to begin searching for a spot on the inserted card surface and, when a spot is found, to supply a signal through the trigger circuit 364 to the clapper solenoid 366 and thus cause a time imprint on the card. This action will occur unless the card-reversed sensor 368 produces a signal prior to the signal from the initiate spot-search sensor 358; if this should occur, the "latch with inhibitor circuit" 360 is inhibited so as to prevent the initiate spot-search sensor from enabling the spot detector 362, and accordingly no imprint will be made until the card is removed and replaced in the proper orientation. Suitable logic circuits are well-known in the art which may be used for preventing output from circuit 360 unless the signal from the initiate spot-search sensor occurs before the signal from the card-reversed sensor.

The signal from the trigger circuit is also supplied to the logic and control circuits 312, thereby signaling them to turn on the card reader 400. As the card is withdrawn from the time-clock apparatus, the card reader will then supply signals representative of the coded indicia to the data storage unit 314, whereby a coded representation of the employee identification number is stored. The output of the card reader is also supplied to the logic and control circuits 312 wherein suitable logic circuits may perform any necessary checks for accuracy or errors in the card or in its reading, and if the reading is not entirely correct insert an indication of a defective reading into the data storage unit along with the corresponding stored employee number. At the same time, the logic and control circuit 312 store data representing the time of the insertion of the card, derived from the output of the clock device 310, in association with the corresponding stored employee identification number.

When the data storage unit is filled, the logic and control circuits 312 supply control signals to cause transfer of the data stored in data storage unit 314 to the record head 316, which responds by recording corresponding magnetic signals on the magnetic tape 418 associated with the cassette 419, preferably in the form of sequential binary bits of information extending along the tape. In addition, the logic and control circuits 312 supply signals to the tape drive motor 420 to advance the tape during such recording. This sytstem avoids the necessity of driving the tape continuously, with very considerable waste of tape length, or alternatively, starting and stopping the tape each time any one employee inserts his card into the time-clock apparatus.

As described previously, at the end of the week the cassette 419 and associated tape 418 may be removed from the time-clock apparatus and taken to a computer center, where it may be machine-read and the information supplied to a computer for computing time and pay due. If the card-holder type of time-card means is used, the cards are replaced in the holders each week, the old ones being removed and stored for any desired time. The printing of the name and/or employee identification number on the time cards may be accomplished using the embossing on the time-card holders. Alternatively, as mentioned above, an ordinary time card without holder may be utilized instead, with employee name and/or number printed on it in conventional manner.

While the invention has been described with particular reference to specific embodiments thereof in the interests of complete definiteness, it will be understood that it may be embodied in any of a variety of forms diverse from those specifically shown and described, without departing from the spirit and scope of the invention as defined by the appended claims.

What is claimed is:

1. In time-clock apparatus of the type in which time-card means having imprint-receiving portions is manually inserted momentarily into said apparatus to cause imprinting on said portions of the time of insertion, and is then manually withdrawn along the path of insertion:

Insertion-sensing means for sensing the insertion into said apparatus of time-card means having imprintable portions and having machine-readable indicia thereon representing information identifying a particular person with whom said time-card means is associated;

a source of time signals;

imprinting means responsive to said insertion-sensing means and to said time signals for imprinting upon said time-card means the time of said insertion;

indicia-reading means activated in response to said insertion-sensing means for automatically reading said indicia as said time-card means is manually moved along the path of its insertion and withdrawal to produce indicia-representing signals representative of said identifying information; and magnetic recording means responsive to said time signals and to said indicia-representing signals for magnetically recording said time of insertion and said indicia-representing signals;

whereby a magnetic record of said time of insertion and of the identity of said person is obtained without interfering with normal manual use of said time-clock apparatus.

2. The apparatus of claim 1, in which said indicia-reading means comprises means responsive to said insertion-sensing means for automatically reading said indicia after said imprinting thereon and as said time-card means is being withdrawn along said path.

3. Apparatus in accordance with claim 1, in which said indicia-reading means comprises photoelectric indicia-reading means.

4. Apparatus in accordance with claim 3, in which said insertion-sensing means comprises photoelectric detector means for observing said imprintable portions of said time-card means during said insertion to produce an imprinter-actuating signal when said time-card means is inserted to a distance for which the last-preceding imprint on said imprintable portion is detected by said photoelectric detector means.

5. Apparatus in accordance with claim 4, comprising means in said apparatus for normally deactivating said photoelectric detector means; and search-initiating means for sensing when said time-card means has been inserted into said apparatus to a distance sufficient for said photoelectric detector means to observe said imprintable portions, and for activating said photoelectric detector means at such time.

6. Apparatus in accordance with claim 5, in which the terminal end of said time-card means inserted into said apparatus is provided with a portion recessed with respect to another portion thereof, said apparatus comprising card-reversal detector means positioned along the path of said recessed portion during said insertion when said time-card means is properly oriented, said search-initiating means being positioned along the path of said other portion of said terminal end and operated by said other portion when said time-card means is properly oriented, said apparatus comprising means responsive to operation of said card-reversal detector means prior to operation of said search-initiating means for preventing operation of said insertion-sensing means when said time-card means is inserted in an incorrect orientation.

7. Apparatus in accordance with claim 1, comprising storage means supplied with said time signals and with said indicia-representing signals for storing them, and means for supplying said signals stored in said storage means to said magnetic recording means and for operating said magnetic recording means only after a plurality of said insertions have occurred.

* * * * *